United States Patent [19]

Weiler et al.

[11] Patent Number: 4,997,014
[45] Date of Patent: Mar. 5, 1991

[54] FILL NOZZLE ASSEMBLY

[75] Inventors: Gerhard H. Weiler, S. Barrington, Ill.; Dieter H. Nagel, Oxford, Wis.

[73] Assignee: Automatic Liquid Packaging, Inc., Woodstock, Ill.

[21] Appl. No.: 407,413

[22] Filed: Sep. 14, 1989

[51] Int. Cl.[5] .................. F16K 27/00; F16K 31/00
[52] U.S. Cl. .................. 141/237; 137/883; 251/331; 141/242
[58] Field of Search .............. 137/862, 870, 869, 885, 137/883; 251/61.1, 129.03, 129.04, 129.17, 129.18, 129.2, 331; 141/234, 236, 237, 238, 240, 242, 243, 244, 1, 97, 98; 222/330, 484, 485, 486, 482

[56] References Cited

U.S. PATENT DOCUMENTS

| 339,111 | 3/1886 | Nye | 141/237 |
|---|---|---|---|
| 3,240,128 | 3/1966 | Wilson | 251/331 |
| 3,552,436 | 1/1971 | Stewart | 137/883 |
| 3,613,729 | 10/1971 | Dora | 257/331 X |
| 3,740,019 | 6/1973 | Kessell et al. | 251/331 X |
| 4,175,590 | 11/1979 | Grandclement | 137/883 |
| 4,241,761 | 12/1980 | Miller | 137/883 |
| 4,304,257 | 12/1981 | Webster | 251/331 X |
| 4,558,845 | 12/1985 | Hunkapiller | 251/331 |
| 4,597,412 | 7/1986 | Stark | 251/331 X |
| 4,671,762 | 6/1987 | Weiler et al. | 425/524 |
| 4,725,040 | 2/1988 | Fornuto et al. | 137/883 |

FOREIGN PATENT DOCUMENTS 43295 11/1930 Denmark ............ 141/237

Primary Examiner—Ernest G. Cusick
Attorney, Agent, or Firm—Dressler, Goldsmith, Shore, Sutker & Milnamow, Ltd.

[57] ABSTRACT

A modular fill assembly is provided for use on a filling machine. The assembly defines a plurality of individual product discharge flow paths each communicating with a common supply. A plurality of fill nozzles are carried by the assembly for each filling a separate container. Individual valves for each flow path are each operable between an open configuration permitting the flow of the product through the associated flow path and a closed configuration occluding the associated flow path. Each valve has a separate actuator for operating the associated valve independently of the other valves.

6 Claims, 6 Drawing Sheets

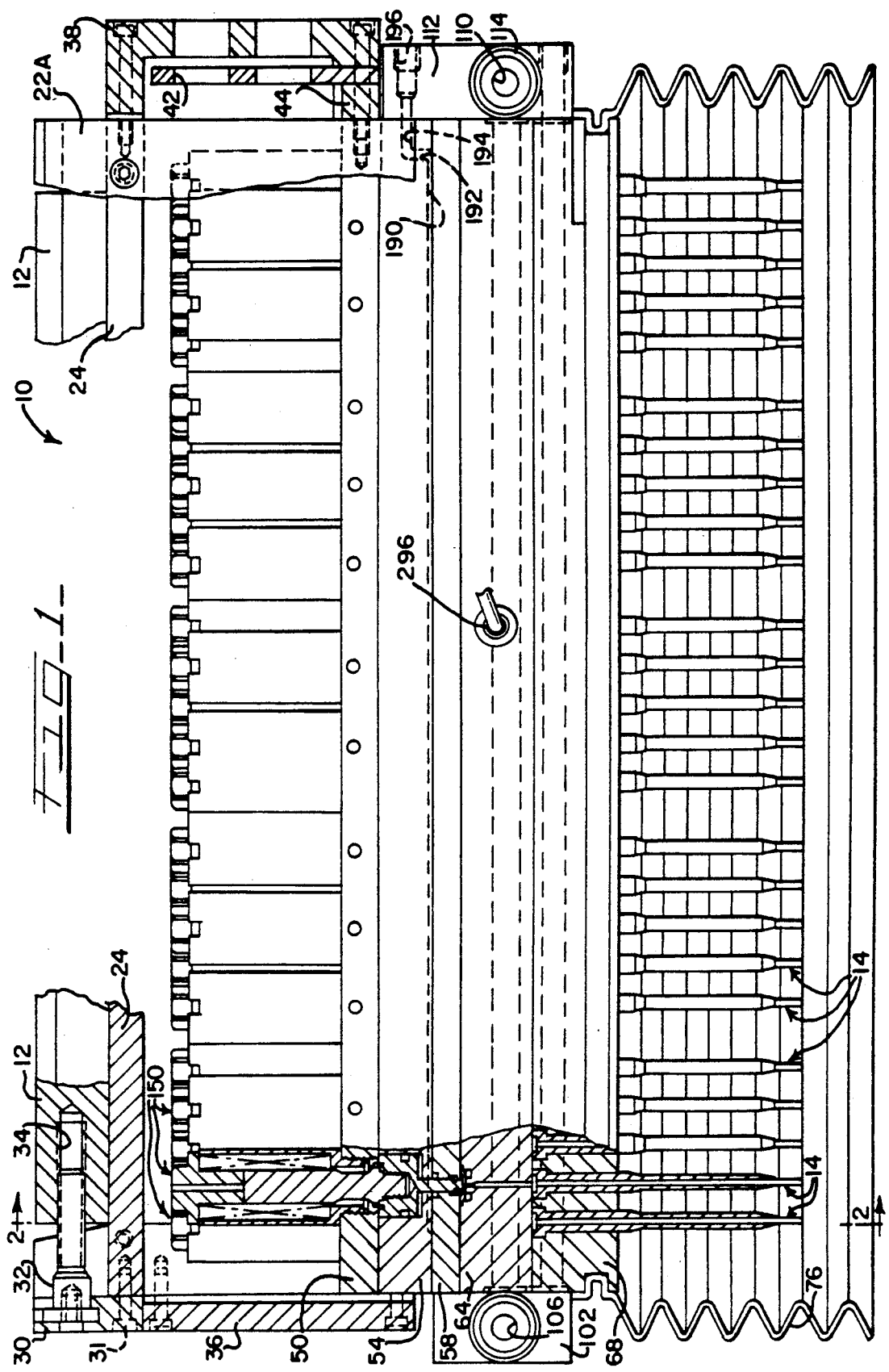

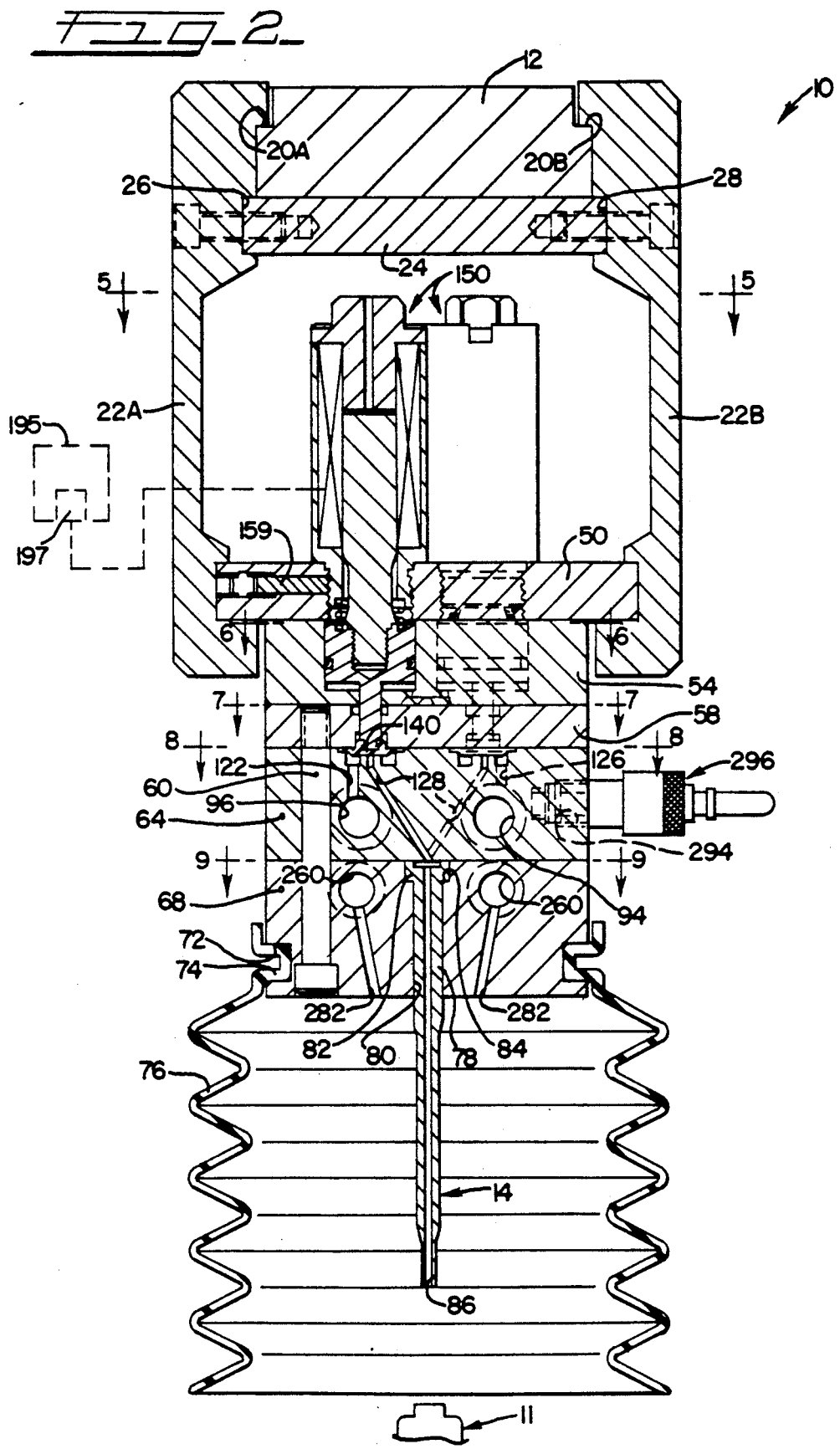

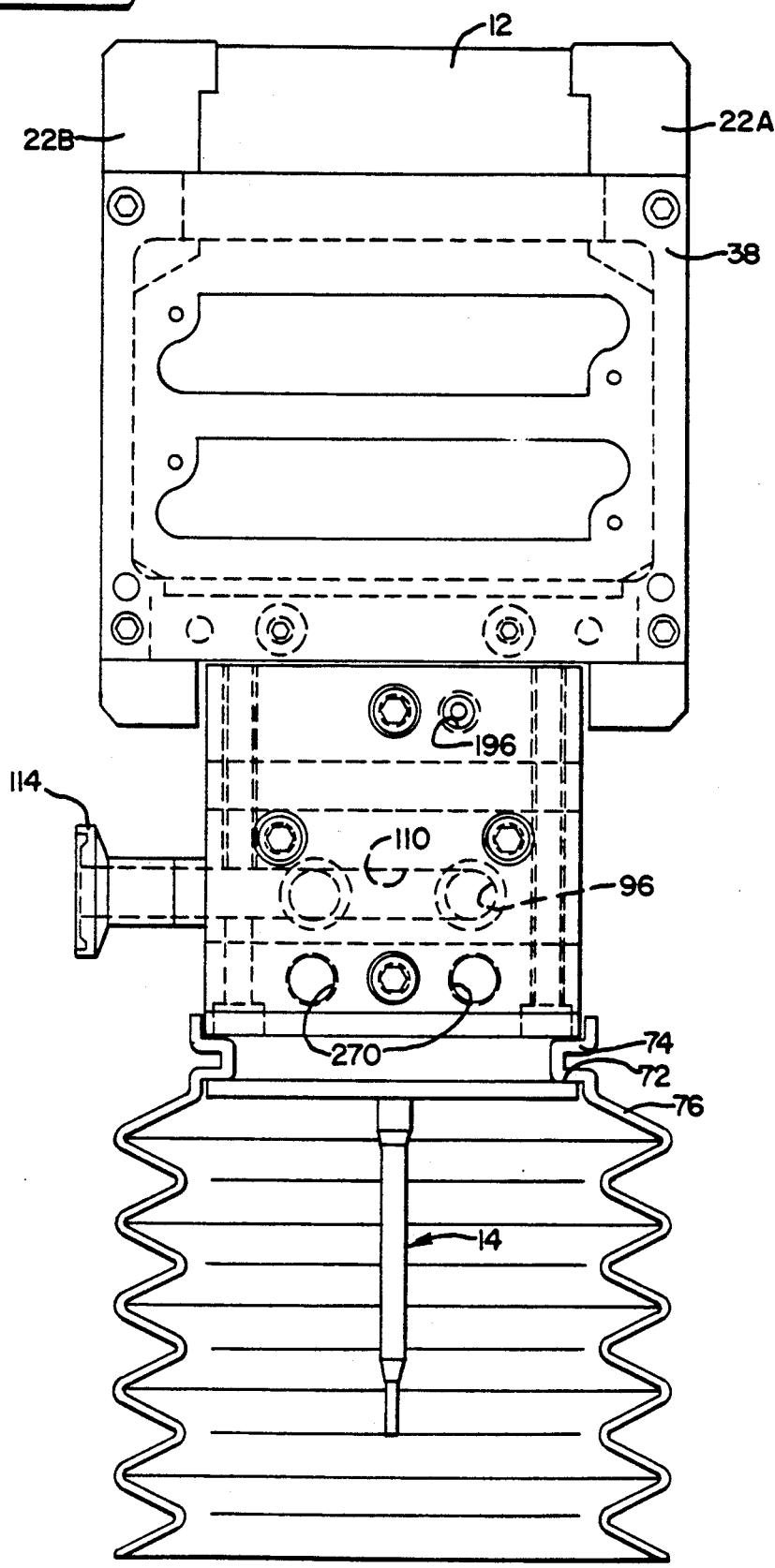

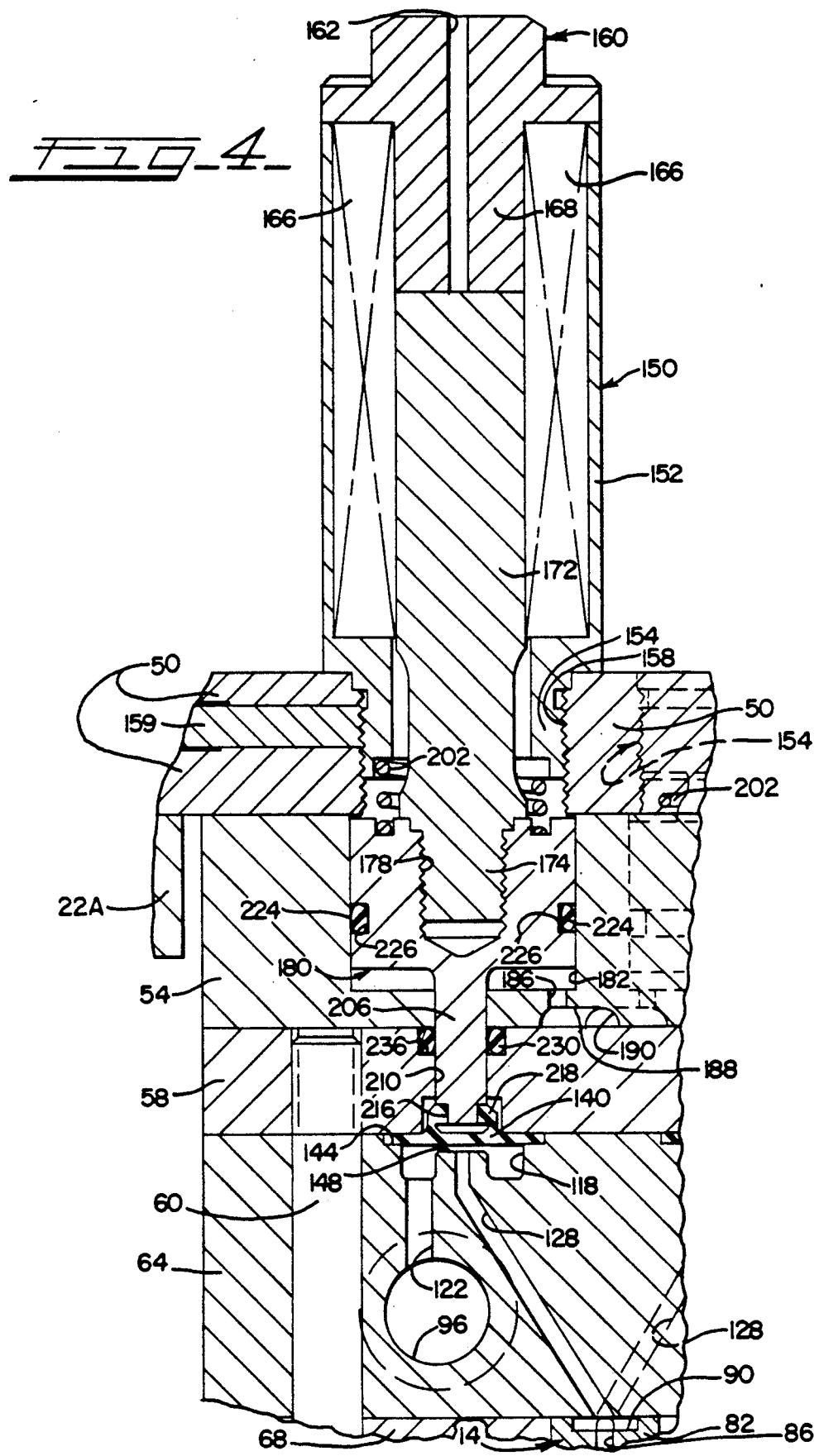
FIG_4

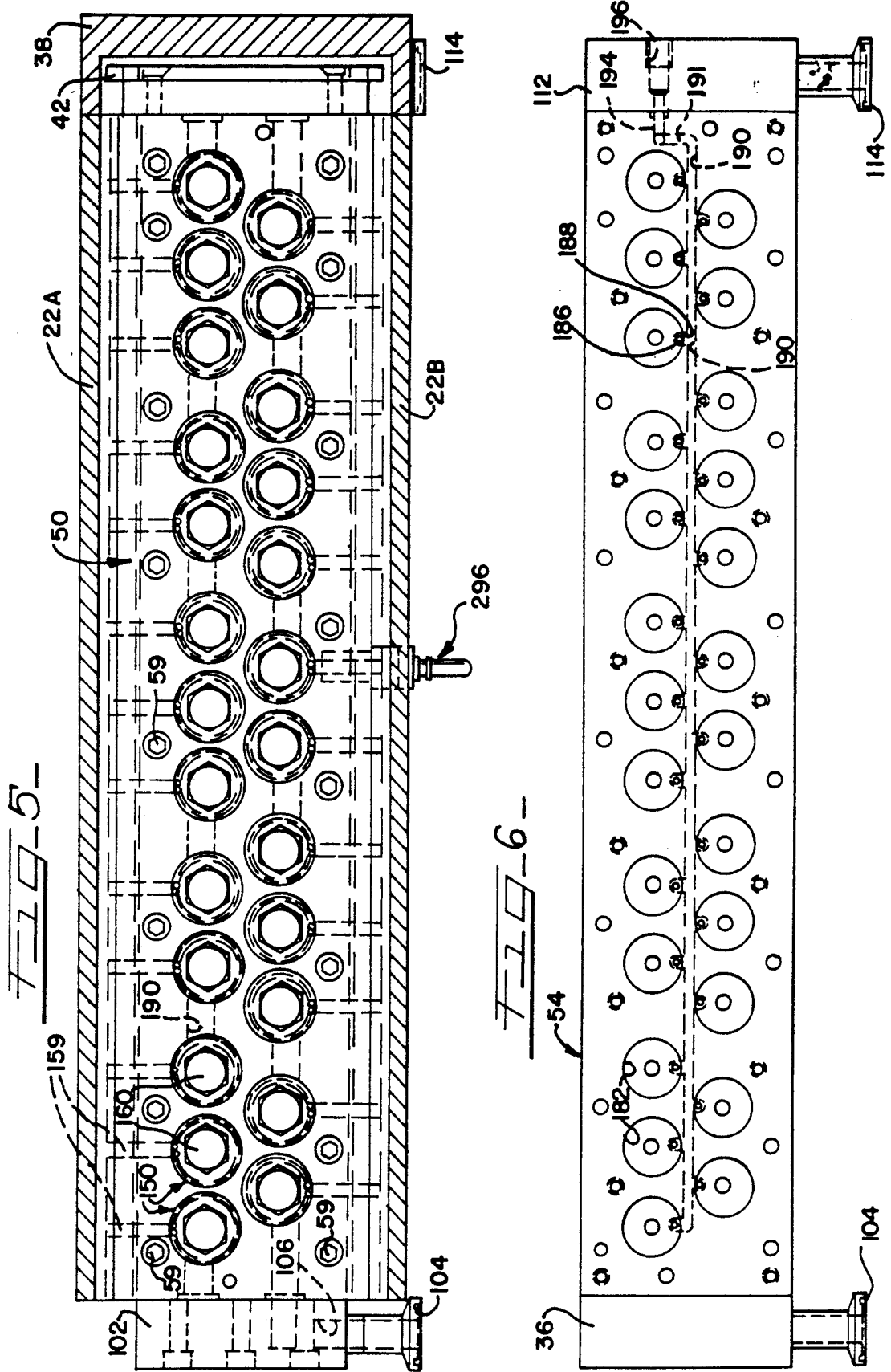

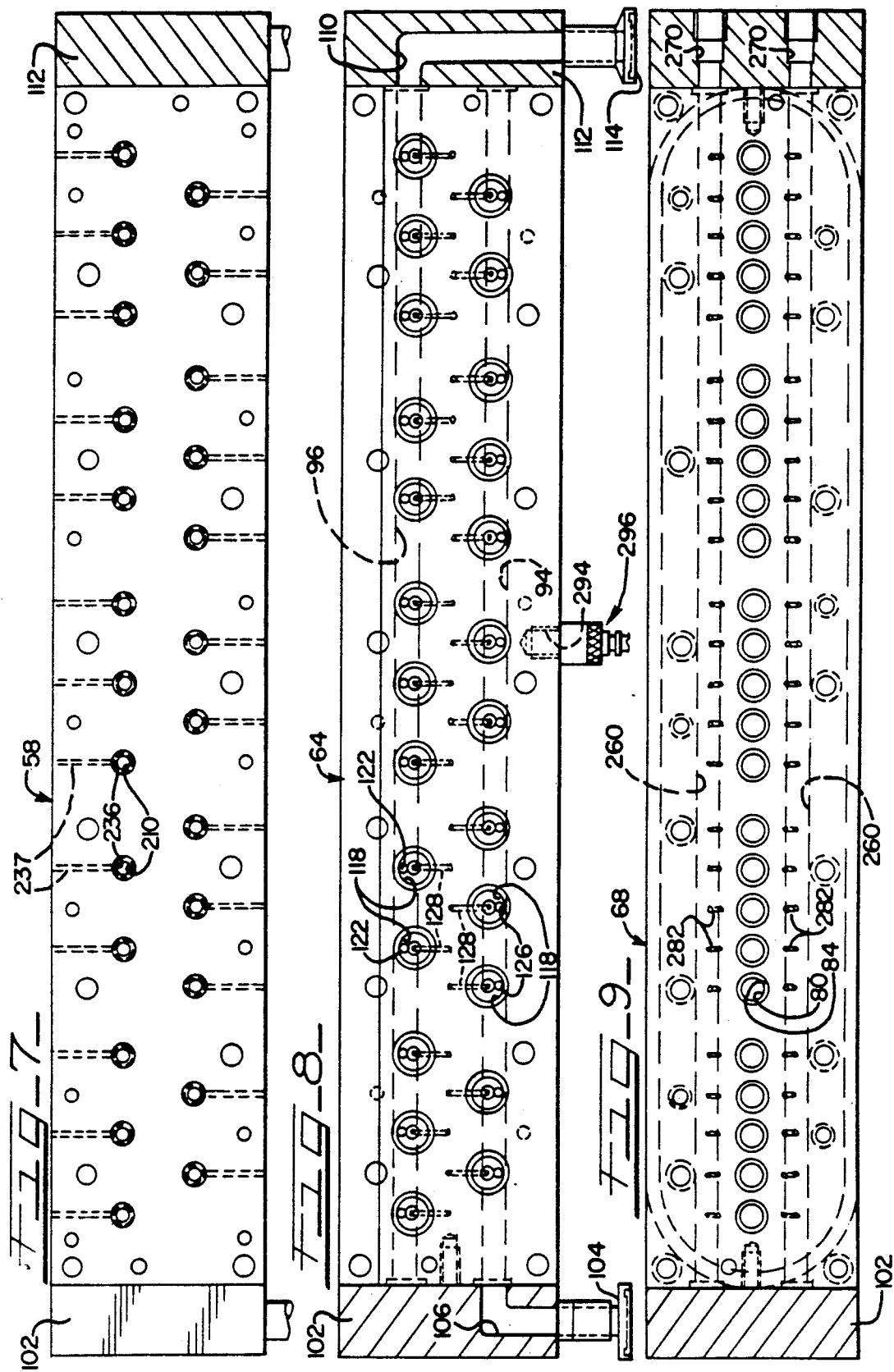

FILL NOZZLE ASSEMBLY

TECHNICAL FIELD

This invention relates to an improved apparatus suitable for use with a container form-fill-seal machine.

BACKGROUND OF THE INVENTION

Various patents disclose methods and apparatus for forming, filling, and sealing a container. See, for example, U.S. Pat. No. 3,597,793 to Weiler, U.S. Pat. No. 3,919,374 to Komendowski, U.S. Pat. No. 4,176,153 to Weiler et al., U.S. Pat. No. 4,178,976 to Weiler et al., Re. No. 27,155 to Hansen and patents cited therein.

Some of the methods and apparatus disclosed in the above-identified patents employ an extendable and retractable combination blowing and filling assembly. Such an assembly includes a nozzle-like filling tube having means operative on a length of extruded parison of thermoplastic material in a main mold for blow molding the container body portion through a top opening in the parison and for then filling the molded container with a liquid product through the top opening.

A means for controlling flow through a plurality of filling tubes in such apparatus is disclosed in the commonly owned U.S. Pat. No. 4,671,762 to Weiler et al. In the apparatus disclosed in that patent, a liquid product manifold 612 defines a product passageway 622 for supplying the liquid product to a plurality of filling tubes 620. Associated with each filling tube 620 is a diaphragm valve which includes a flexible diaphragm 640 that is normally biased by a spring 644 to close the flow to the associated fill tube 620. All such on-off valves are mounted to a common reciprocating actuation plate 654 so that all of the on-off valves are opened or closed together at the same time. With this actuation mechanism, all of the valves are held open for a predetermined time period to permit a sufficient quality of the liquid product to flow through the filling tubes 620. After the desired quantity of product has been introduced into the containers, all of the on-off valves are closed together at the same time by moving the actuation plate 654 back to the unactuated position.

Although the commercial apparatus discussed above works very well for the applications for which it was designed, it would be desirable to provide an improved apparatus wherein the filling times of the molded containers could be individually controlled. It would also be advantageous if the filling times could be automatically adjusted—preferably from a remote central control system. This would permit the amount of product in each container to be individually regulated without shutting down production. In a typical process for filling a plurality of containers simultaneously, it would then be possible to individually adjust the total flow to each container so that each container could be provided consistently with the same amount of liquid product.

Further, it would be beneficial if such improved apparatus could be provided in the form of a modular filling assembly that could be readily incorporated in existing conventional filling machines.

Other improvements would be desirable as well. Specifically, machines incorporating the apparatus disclosed in the above-discussed U.S. Pat. No. 4,671,762 employ a product metering system in a manner that requires each filling tube 620 to be provided with a separate metering valve 610 for controlling the rate of flow into the container. Each metering valve 610 must be manually adjusted to set the flow rate. When a large number of containers are filled simultaneously, the initial manual adjustment of each associated metering valve 610 is time consuming.

Further, when it is desired to clean the system with sterilizing steam, a sufficient flow of sterilizing steam must be passed through the liquid product flow passages, including the passages defined by filling tubes and associated valves. With the apparatus of the type disclosed in the above-discussed U.S. Pat. No. 4,671,762, the flow rate of sterilizing steam passing through each filling tube depends upon the setting of the associated metering valve 610. In order to ensure that a sufficient flow rate of sterilizing steam passes through the system, each metering valve must be opened a sufficient amount (usually full open) prior to initiating the steam sterilization. This, of course, requires a time-consuming manual adjustment of the metering valves. In view of this, it would be desirable to provide a means for automatically adjusting the flow paths through all of the filling nozzles to accommodate a sufficient flow of sterilizing steam. It would be beneficial if this adjustment could be effected substantially automatically and simultaneously with respect to all of the filling nozzles.

SUMMARY OF THE INVENTION

An apparatus is provided for reliably and adjustably filling a plurality of containers with a liquid product. The apparatus is provided as a modular fill nozzle assembly which includes a plurality of fill nozzles. The dispensing time period of the nozzles can be adjusted from a remote location without shutting down the operation of the fill nozzles.

The assembly includes a liquid product discharge means defining a separate or individual flow path for each of the nozzles for directing the liquid product from a common product supply to each associated nozzle communicating therewith.

Separately actuatable valve means are provided for each flow path. Each individual valve means is operable between an open configuration permitting the flow of the product through the associated flow path and a closed configuration occluding the associated flow path.

Separate actuating means are each provided for, and are associated with, each of the individual valve means. Each actuating means actuates an associated valve means independently of the other valve means.

In a the preferred embodiment, the separate actuating means include a spring-biased electric solenoid operator for each valve means. Control means energize each electric solenoid operator for a selected time period to dispense a desired amount of liquid product in each container.

Another preferred form of the invention also includes a feature for accommodating flow of sterilizing steam. Means separate from the electric solenoid operators are provided for simultaneously moving all of the individual solenoid valve pistons to open all of the solenoid valves concurrently. This assures a sufficient flow passage through each valve for the sterilizing steam during sterilization.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a cross-sectional view of a modular fill nozzle assembly of the present invention;

FIG. 2 is a cross-sectional view taken generally along the plane 2—2 in FIG. 1 and showing one of the solenoid actuated diaphragm valves in a full closed configuration;

FIG. 3 is a right-hand end of view of the assembly illustrated in FIG. 1;

FIG. 4 is a greatly enlarged, fragmentary, cross-sectional view of a portion of the fluid product flow path at an associated diaphragm valve shown in a full open configuration;

FIG. 5 is a cross-sectional view taken generally along the plane 5—5 in FIG. 2;

FIG. 6 is a plan view taken along the plane 6—6 in FIG. 2 showing the top surface of the air fill plate with the internal, mounted components omitted from the view to better illustrate the internal configuration of the plate;

FIG. 7 is a plan view taken along the plane 7—7 in FIG. 2 showing the top surface of the spacer plate with the internal, mounted components omitted from the view to better illustrate the internal configuration of the plate;

FIG. 8 is a plan view taken generally along the plane 8—8 in FIG. 2 showing the top surface of the metering block or plate with the internal, mounted components omitted from the view to better illustrate the internal configuration of the plate; and FIG. 9 is a plan view taken generally along the plane 9—9 in FIG. 2 showing the top surface of the fill tube retaining plate with the internal mounted components omitted from the view to better illustrate the internal configuration of the plate.

DESCRIPTION OF PREFERRED EMBODIMENTS

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

The apparatus of this invention is used with certain conventional components the details of which, although not fully illustrated or described, will be apparent to those have skill in the art and an understanding of the necessary functions of such mechanisms.

Some of the Figures illustrating the preferred embodiment of the apparatus show structural details and mechanical elements that will be recognized by one skilled in the art. However, the detailed descriptions of such elements are not necessary to an understanding of the invention, and accordingly, are not herein presented.

Referring now to the drawings, FIG. 1 shows the individually controlled fill tube or nozzle assembly of the present invention designated generally by reference numeral 10. The assembly 10 is adapted to be mounted to a container form-fill-seal machine (not illustrated) which is designed for dispensing a liquid product into a plurality of containers 11 (FIG. 2). Typically, the nozzle assembly or machine also includes means for providing a gas for the blow molding of a container from a parison of thermoplastic material in a mold assembly (not illustrated) and means for sealing or closing the filled container. It is contemplated that the fill nozzle assembly of the present invention may also be employed with a machine that is intended only to fill substantially simultaneously a plurality of containers that have been previously fabricated by another machine and that will be subsequently closed by another apparatus.

The fill nozzle assembly 10 of the present invention functions, as is explained in detail hereinafter, to dispense predetermined amounts of liquid product into the containers 11. The time period for dispensing the product (and thus, the amount of the product) can be separately adjusted for each container 11 from a remote location.

Another preferred form of the invention also includes a feature for accommodating the flow of sterilizing steam through the nozzle assembly 10. Specifically, a special system is provided to maintain the flow control elements in the assembly 10 together in full open positions. This assures sufficiently large flow passages for the sterilizing steam.

The fill nozzle assembly 10, in the preferred embodiment illustrated in FIG. 1, includes a fill nozzle assembly mounting plate 12 which is adapted to be bolted to a carriage or slide (not illustrated) of a conventional filling machine. Such a carriage or slide can be reciprocated vertically between an elevated position (as shown in FIG. 2) to provide clearance around the top of the containers 11 in the mold assembly and a lowered position wherein the fill nozzle assembly 10 is located to engage the mold assembly and fill the molded containers 11 therein through a plurality of fill nozzles or tubes 14.

As illustrated in FIG. 2, the upper lateral edges of the mounting plate 12 define shoulders 20A and 20B which are each engaged by gib plates 22A and 22B, respectively. The gib plates 22A and 22B are secured with suitable machine screws to a gib mounting plate 24 positioned under the lower surface of the fill nozzle mounting plate 12. The gib plate 22A defines a channel 26 for receiving one side of the gib mounting plate 24, and the gib plate 22B defines a channel 28 for receiving the other side of the gib mounting plate 24.

An adjustment plate 30 is mounted with a screw 31 to the gib mounting plate 24. The adjustment plate 30 receives the head of an adjusting screw 32 which has a shank threadingly engaged in a bore 34 in the end of the fill nozzle mounting plate 12.

The above-described components 12, 24, 22A, 22B, 30, 31, and 32 may be regarded as a frame or frame means for mounting the fill nozzle assembly 10 to the filling machine slide or carriage. The remaining components of the fill nozzle assembly 10 are mounted to this frame by means of a retaining block 50 (FIGS. 1, 2, and 5). A plate 54 is disposed on the lower surface of the retaining block 50, and a spacer plate 58 is disposed on the bottom of the plate 54. The plates and block are mounted together with sets of suitable screws. For example, FIG. 5 shows the heads of mounting screws 59 received in counterbores in the block 50. Appropriate screw holes and dowel pin aligning holes are provided in plates 50, 54, and 58 as shown in FIGS. 5, 6, and 7 respectively.

The shanks of screws 60 are threadingly engaged with the spacer plate 58 and extend downwardly through a common metering block or manifold 64 (i.e., a common metering manifold) into a fill tube retaining plate 68. The head of each screw 60 engages a counter bore in the fill tube retainer plate 68 to secure the metering block 64 and fill tube retaining plate 68 to the spacer plate 58. Appropriate screw holes and dowel pin aligning holes are provided in the plates 58 and 68 as well as in metering block 64 as shown in FIGS. 7, 9, and 8, respectively.

A front cover 36 is provided below the adjustment plate 30. At the other end of the assembly an exterior receptacle mounting plate 38 is attached to the ends of the gib plates 22A and 22B for accommodating electrical connections. A plug mounting plate 42 is preferably mounted inwardly of the receptacle mounting plate 38, but is spaced outwardly of the ends of the gib plates 22A and 22B by a spacer 44.

Referring again to FIG. 2, the lower peripheral edge of the fill tube retaining plate 68 defines a channel 72 in which is received an inwardly directed flange structure 74 of a downwardly depending, flexible bellows 76. The bellows 76 is preferably fabricated from a silicone rubber material and is adapted to engage exterior portions of the mold assembly (not illustrated) in which the containers 11 are initially formed and subsequently held during the filling and sealing steps.

Each nozzle or fill tube 14 extends downwardly below the fill tube retaining plate 68 inside the bellows 76 and has a neck section 78 received in a bore 80 in the retaining plate 68. Further, each fill tube 14 includes an enlarged diameter head 82 for being received in a mating counterbore 84 in the plate 68. Each tube 14 also defines an internal discharge bore or passage 86 which extends from the distal end thereof to a cylindrical chamber 90 in the top of the fill tube head 82 at the lower surface of the metering block 64.

The fluid product is supplied to each fill tube 14 at the chamber 90 from passageways in the overlying metering block 64. Specifically, with reference to FIGS. 1-4 and 8, the metering block 64 defines a first header bore or passageway 94 and a second header bore or passageway 96. Each bore 94 and 96 extends the entire length of the metering block 64 as best illustrated in FIG. 8.

The bore 94 is supplied with fluid product via a front manifold block 102 which defines an inlet pipe connection 104 and a flow passage 106 communicating with the bore 94. A portion of a front manifold block 102 is adjacent to, and occludes the end of, the bore 96.

At the other end of the metering block 64, the bore 96 is supplied through a passage 110 defined in a rear manifold block 112 which has an inlet pipe connection 114 communicating through the passage 110 with the bore 96. The portion of the rear manifold block 112 adjacent the end of the bore occludes the bore 94 at that point.

Seal means such as 0-rings are provided in the metering block 64 around the ends of the bores 96 and 94 adjacent the front manifold block 102 and rear manifold block 112 to effect a seal.

The metering block 64 defines a plurality of generally circular receiving chambers 118 (FIGS. 4 and 8). Each chamber 118 is associated with a specific one of the fill tubes 14. The receiving chambers 118 are arranged in two rows. The chambers 118 in one row communicate with the header bore 96 through a row of riser passages 122. The receiving chambers 118 in the other row communicate with the header bore 94 through another row of riser passages 126 (FIGS. 2 and 8).

Each receiving chamber 118 communicates with the chamber 90 of an associated fill tube 14 via a downwardly angled bore or passage 128 in the block 64. Thus, the common metering block or manifold 64, along with the manifold blocks 102 and 112, can be characterized as comprising liquid product discharge means defining an individual discharge flow path for each of the nozzles or fill tubes 14.

The flow into each fill tube 14 is controlled by the movement of a valve member 140 (FIG. 4) which is disposed over the receiving chamber 118 of the associated fill tube 14. In the preferred embodiment illustrated, the valve member 140 is a diaphragm fabricated from silicone rubber. The diaphragm member 140 has a generally circular configuration, and the outer periphery of the diaphragm valve member 140 is received in a counterbore 144 defined in plate 64 around the receiving chamber 118 as best illustrated in FIG. 4.

The receiving chambers 118 each have an upstanding central post 148 below the valve member 140. FIG. 2 illustrates the valve member 140 in the lowered, closed position occluding the flow through the receiving chamber 118, and FIG. 4 illustrates the fully opened position wherein the valve member 140 is raised to an elevation spaced above the receiving chamber central post 148. The valve member 140 is adapted to move between the elevated, opened position and the lowered position against the top of the post 148 to occlude the flow path through the receiving chamber 118 into the discharge passageway 128 that communicates with the associated fill tube 14.

Each valve member 140 is moved or actuated by an actuating means which, in the preferred embodiment illustrated, is a spring-biased electric solenoid actuator or operator 150. As best illustrated in FIG. 4, the solenoid operator includes a housing 152 which has a lower end 154 which is threadingly engaged with a threaded bore 158 in the solenoid retaining plate 50. The housing lower end 154 of each solenoid operator 150 is locked in the retaining block 50 by means of a lock plug 159 as best illustrated in FIGS. 2, 4, and 5.

The solenoid operator 150 includes an end cap 160 on the upper end of the housing 152. Each end cap 160 has a suitable vent hole 162 extending from the bottom to the top of the end cap. A coil 166 is disposed in annular configuration inside the housing 152 around a downwardly projecting central portion 168 of the end cap 160.

A plunger 172 is disposed within the coil 166 below the portion 168 of the end cap 160. The plunger 172 has a reduced diameter distal end portion 174 which is threaded and is engaged with a threaded receiving bore 178 of a piston 180. The piston 180 is slidably disposed within a cylindrical chamber 182 defined within the plate 54.

The plate 54 also defines a vertical air passage 186 extending from the bottom of the cylindrical chamber 182 and communicating through a lateral passage 188 with a semicylindrical header passage 190 which runs nearly the entire length of the plate 50. At one end, adjacent the front manifold block 102, the passage 190 terminates within the plate 54. At the other end, adjacent the rear manifold block 112, the passage 190 connects with a transverse passage 191 (FIG. 6) which connects with a vertical bore 192 (visible in FIG. 1 only) that in turn connects with a horizontal bore 194 (FIG. 6). The horizontal bore 194 communicates with a threaded bore 196 in the rear manifold block 112 for receiving the threaded end of a conduit or hose (not illustrated) for supplying air or other gas.

The introduction of pressurized gas through the rear manifold bore 196 and connected flow passageways 194, 192, 191, and 190 results in pressurizing each chamber 182 below each solenoid operator piston 180 so as to urge the piston upwardly for purposes described in detail hereinafter.

Each solenoid operator 150 is normally biased downwardly by means of a helical coil spring 202 acting between the bottom of the solenoid operator housing threaded portion 154 and the top of the piston 180. The solenoid operator 150 is shown in FIG. 4 in an energized position wherein the plunger 172 is retracted upwardly against the end cap 160 to raise the piston 180 against the biasing force of the spring 202.

The piston 180 includes a rod 206 which extends downwardly through a bore 210 in the spacer plate 58 and which includes an annular groove 216 at its lower end for receiving an upstanding annular collar 218 of the diaphragm valve member 140. Thus, when the electric solenoid actuator 150 is energized to raise the piston 180 to the elevated position (FIG. 4), the valve member 140 is raised away from the central post 148 of the receiving chamber 118 to permit the flow of product through the receiving chamber and fill tube 14.

Preferably, the piston 180 is circumferentially sealed by a suitable o-ring 224 received in an annular groove 226 defined in the piston. Further, the piston rod 206 is circumferentially sealed by means of an o-ring 230 disposed in a counterbore 236 around the bore 210 in the spacer plate 58.

In order to relieve leakage of pressurized air that may be forced down past the o-ring 236 around the piston rod 206, the plate 58 defines a vent bore 237 (FIG. 7) connecting each piston rod bore 210 with the ambient atmosphere at the edge of the plate 58. The vent bore 237 also serves as a means for indicating when the diaphragm valve member 140 is leaking during the container filling operation. Specifically, should there be a leakage of pressurized fluid product from the chamber 118 through or around the valve member 140, the leaking product will be forced out of the associated vent bore 237 where it will provide a visual indication of the leakage.

The above-described unique configuration and assembly of the plate 54 with the other components provides a pressurizable chamber 182 below each solenoid actuator piston 180 and provides means for introducing pressurized gas into each chamber 182. This advantageously permits the simultaneous pressurization of each chamber 182 so that all of the solenoid actuator pistons 180 can be raised simultaneously to open the valve members 140 in the flow paths to the fill tubes 14. The valve members 140 can thus be simultaneously maintained in a full open configuration to accommodate steam flow through the fluid product passages during a sterilization process prior to normal operation of the machine 10. This eliminates having to individually energize each solenoid valve actuator or otherwise manually position each valve separately.

After the sterilization process has been completed, the machine 10 can be operated normally to form, fill, and seal containers 11. A suitable control system or means 195 can be provided for individually energizing each solenoid actuator 150 during such normal operation.

Preferably, as shown in FIG. 2, the control system 195 includes a timing means or timer 197 which is designed to permit the energization of each solenoid actuator 150 separately for a predetermined time interval which can be adjusted for each solenoid actuator 150 individually. Thus, when the formed containers 11 are being filled with the fluid product, the fill time can be individually controlled to provide the desired amount of product in each container.

Typically, a user of the machine 10 would want to fill each of the containers with the same amount of fluid. Owing to variations in machining tolerances of the product flow passageways and resulting pressure drop differences, there may be small differences in the flow rates out of the fill tubes 14. These differences in the flow rates can be easily accommodated by individually controlling each associated solenoid actuator 150 to remain open for more or less time relative to the other solenoid actuators so that the total amount of fluid product delivered to each container is the same. Of course, if different amounts of fluid product are desired in the containers, the opening intervals of the various solenoid actuators 150 can be set as may be necessary to provide such different amounts of fluid product.

The flow of the fluid product past each diaphragm valve member 140 can be precisely controlled. By adjusting the threaded components in the solenoid actuator 150, the full open distance between the lower surface of the diaphragm member 140 and the upper surface of the upstanding post 148 can be set. It has been found that the assembly 10 of the present invention operates very effectively when the cross-sectional flow area of the flow path past the diaphragm valve member 140 into the discharge bore 128 in the full open position (as illustrated in FIG. 4) is greater than the cross-sectional flow area of the fill tube bore 86. Preferably, the full open flow area past the valve member 140 is less than about twice the flow area of the fill tube bore 86.

The novel fill nozzle assembly 10 of the present invention also readily accommodates the introduction of a pressurized shield gas inside the bellows 76 around the fill tubes 14. Specifically, with reference to FIGS. 2 and 9, the fill tube retaining plate 68 defines a pair of parallel, spaced-apart bores 260 which each extend through the entire length of the plate 68 on either side of the fill tube mounting bores 80. The front manifold block 102 occludes the open ends of the bores 260 at one end of the plate 68. Suitable o-rings are provided in the front end face of the fill tube retaining plate 68 around the bores 60 to effect a leak tight seal at the manifold block 102.

At the other end, the rear manifold block 112 defines a pair of threaded connection bores 270. Each bore 270 is aligned with one of the fill tube retaining plate bores 260. An o-ring seal is provided in the fill tube retaining plate end face adjacent the rear manifold block 112 around each of the bores 260 to effect a tight seal. Each bore 270 is adapted to receive a threaded conduit or hose (not illustrated) which provides a source of pressurized gas, such as nitrogen or air.

The fill tube retaining plate 68 also defines a plurality of downwardly angled discharge bores 282 (FIG. 2).

Each bore 282 extends from one of the bores 260 to the lower surface of the fill tube retaining plate 68 adjacent one of the fill tubes 14. As best illustrated in FIG. 9, there are two such discharge bores 282 associated with each fill tube 14 along the length of the fill tube retaining plate 68. This ensures that the pressurized shield gas will discharge in an unobstructed flow around the fill tubes 14 within the bellows 76.

The fill nozzle assembly 10 of the present invention also readily accommodates sensors for use in various control systems. For example, in the preferred embodiment of the assembly 10 illustrated in FIG. 2, the metering block 64 defines a threaded receiving cavity 294 for threadingly receiving a temperature sensor, such as a thermocouple 296. The thermocouple 296 is located, as best illustrated in FIG. 8, at approximately the middle of the metering block 64. The thermocouple 296 is inserted into the metering block 64 to a depth where the thermocouple sensing element is very close to the cylindrical inner surface defining the fluid product header bore 94. The thermocouple 296 can thus be used to monitor the temperature of the portion of the metering block 64 adjacent the fluid product header bore 94. This is useful during steam sterilization of the fluid product flow passages prior to normal machine operation. Specifically, during steam sterilization, the surfaces of the components that are to later contact the fluid product must be raised to a sufficiently high, sterilizing temperature and held at or above that temperature for a time interval sufficient to ensure proper sterilization. The thermocouple 296 can thus be employed to provide the temperature feedback signal necessary to control the sterilization process.

It will be readily observed from the foregoing detailed description of the invention and from the illustrated embodiment thereof that numerous variations and modifications may be effected without departing from the true spirit and scope of the novel concepts o principles of this invention.

What is claimed is:

1. Apparatus for filling a plurality of containers with a predetermined amount of liquid product, said apparatus comprising:

a plurality of fill nozzles;

a common metering manifold for said plurality of fill nozzles which is provided with liquid product discharge means for defining an individual discharge flow path for each of said nozzles individually for directing said liquid product from a common supply of said product to each associated nozzle communicating therewith;

individual valve means mounted to said common metering manifold for communicating with, and controlling flow of said product through, each of said flow paths, each said valve means being operable between an open configuration permitting the flow of said product through one of said flow paths and a closed configuration occluding said one flow path;

separate actuating means for each independently operating a different one of said individual valve means, each said actuating means including an electric solenoid operator for being energized to open one of said valve means and including a spring for biasing said operator when deenergized to close said one valve means under the urging of said spring; and control means for (1) controlling the energizing of each said electric solenoid operator independently of the other electric solenoid operators and (2) initiating the energization of all said electric solenoid operators substantially simultaneously, said control means including timing means for energizing each said electric solenoid operator for a selected length of time.

2. The apparatus in accordance with claim 1 in which each said valve means includes an associated valve member;

each said actuating means includes biasing means for biasing said associated valve member to a first position to occlude one of said flow paths whereby said valve means is in said closed configuration;

said apparatus includes a plate defining a plurality of chambers and defining air passage means for supplying pressurized air to said chambers;

each said actuating means includes a piston received in one of said chambers and slidably disposed for movement in said one chamber, said piston being connected with an associated one of said valve members for moving said associated valve member between said first position wherein said valve means is in said closed configuration and a second position wherein said valve means is in said open configuration; and said apparatus further includes pressurizing means for pressurizing said air passage means and all of said chambers in said plate on one side of said pistons to move said pistons against the urging of said biasing means to force all of said valve members substantially simultaneously to said second positions wherein each of said valve means is in said open configuration.

3. The apparatus in accordance with claim 1 in which each said nozzle includes an internal discharge bore.

4. The apparatus in accordance with claim 3 in which the cross-sectional flow area of each said flow path through the associated valve means in the full open configuration is less than about twice the cross-sectional flow area of said nozzle bore.

5. A modular fill assembly for use on a filling machine that has a supply conduit for supplying a liquid product through a plurality of fill nozzles for filling a plurality of containers with predetermined amounts of liquid product, said modular fill assembly comprising:

frame means for being mounted to said machine;

a liquid product discharge means carried by said frame means for defining a plurality of individual discharge flow paths each communicating between said supply conduit and one of said fill nozzles;

separate valve means for each of said flow paths operable between an open configuration permitting the flow of said product through one of said flow paths and a closed configuration occluding said one flow path; and separate actuating means for each independently operating a different one of said individual valve means, each said actuating means including an electric solenoid operator for being energized to open one of said valve means and including a spring for biasing said operator when deenergized to close said one valve means under the urging of said spring; and control means for (1) controlling the energizing of each said electric solenoid operator independently of the other electric solenoid operators and (2)

initiating the energization of all said electric solenoid operators substantially simultaneously, said control means including timing means for energizing each said electric solenoid operator for a selected length of time.

6. Apparatus for filling a plurality of containers with a predetermined amount of liquid product, said apparatus comprising:

a plurality of fill nozzles;

a common metering manifold for said plurality of fill nozzles which is provided with liquid product discharge means for defining an individual discharge flow path for each of said nozzles individually for directing said liquid product from a common supply of said product to each associated nozzle communicating therewith;

individual valve means mounted to said common metering manifold for communicating with, and controlling flow of said product through, each of said flow paths, each said valve means being operable between an open configuration permitting the flow of said product through one of said flow paths and a closed configuration occluding said one flow path, each said valve means including an associated valve member;

a plate defining a plurality of chambers and defining air passage means for supplying pressurized air to said chambers;

separate actuating means for each independently operating a different one of said individual valve means, each said actuating means including biasing means for biasing said associated valve member to a first position to occlude one of said flow paths whereby said valve means is in said closed configuration, each said actuating means including a piston received in one of said chambers and slidably disposed for movement in said one chamber, said piston being connected with an associated one of said valve members for moving said associated valve member between said first position wherein said valve means is in said closed configuration and a second position wherein said valve means is in said open configuration; and pressurizing means for pressurizing said air passage means and all of said chambers in said plate on one side of said pistons to move said pistons against the urging of said biasing means to force all of said valve members substantially simultaneously to said second positions wherein each of said valve means is in said open configuration.

* * * * *